Patented May 2, 1944

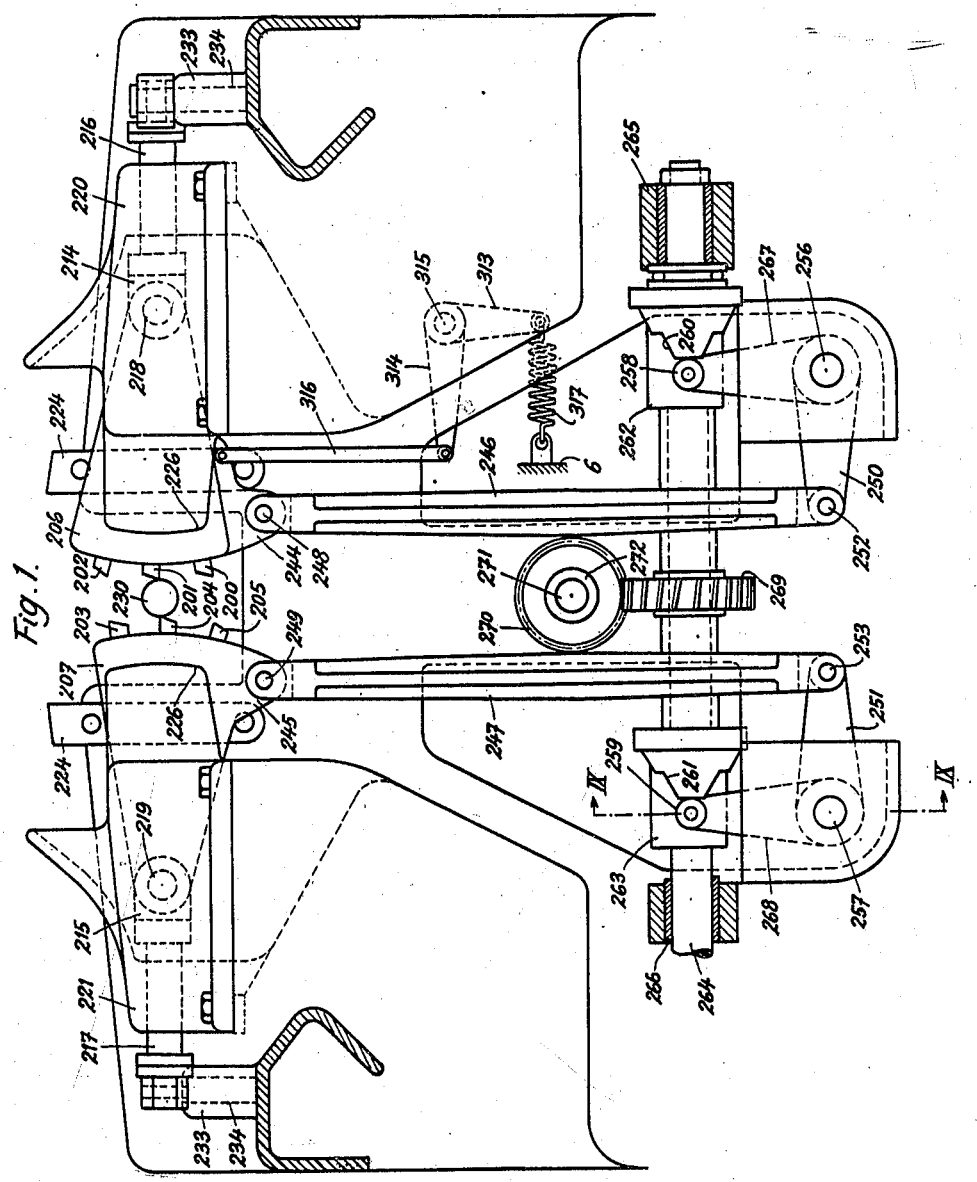

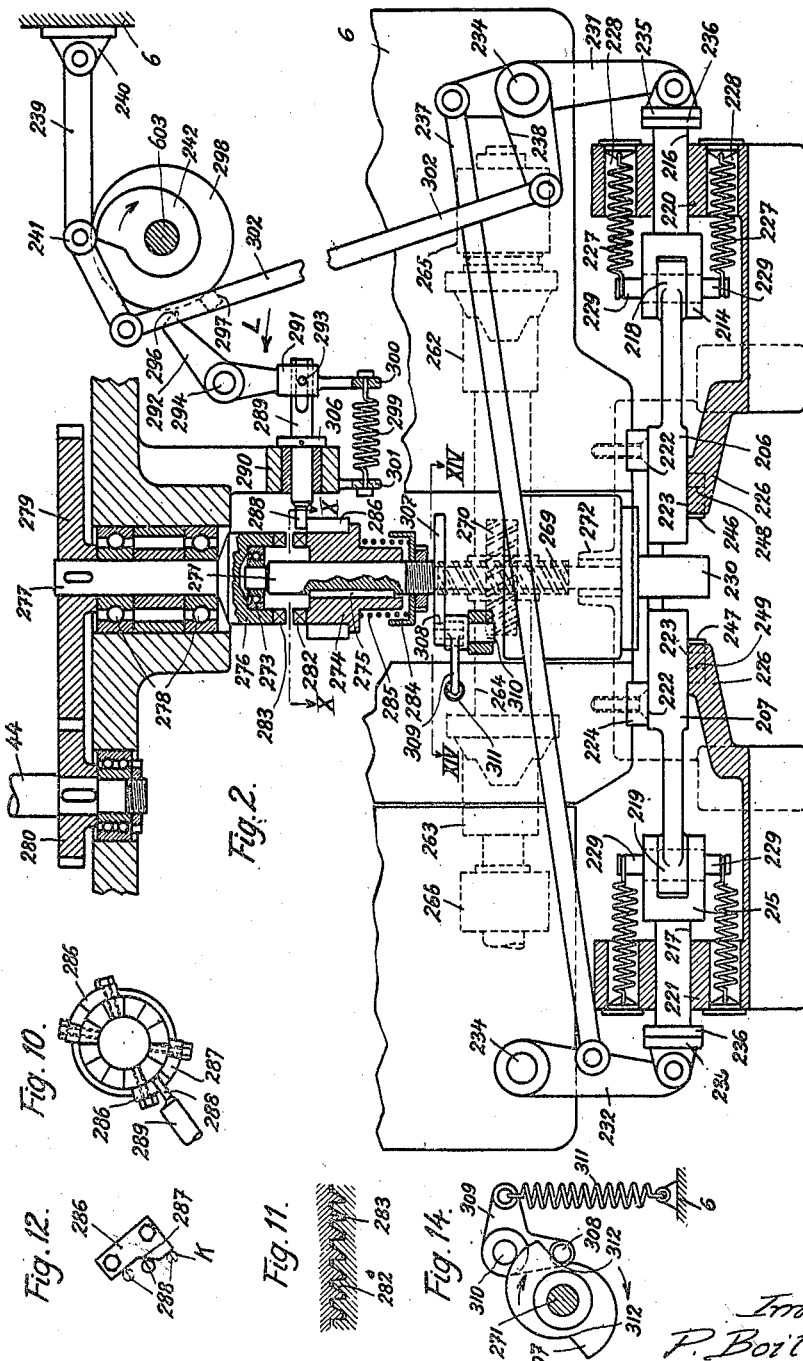

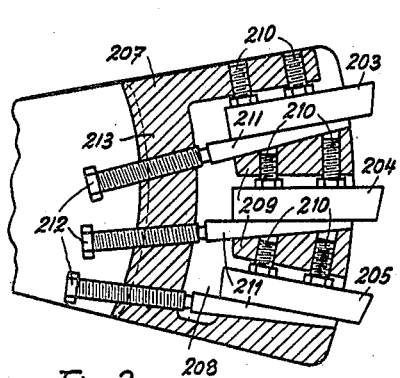
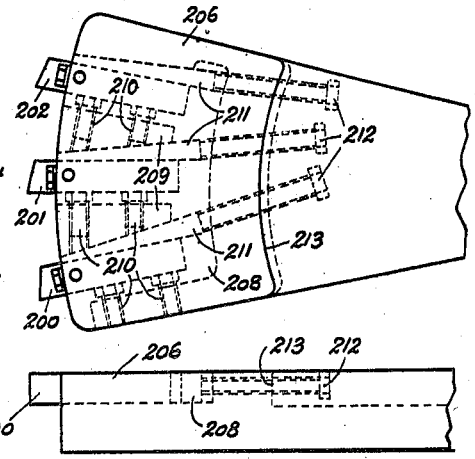
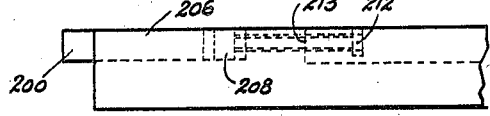
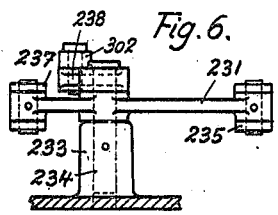
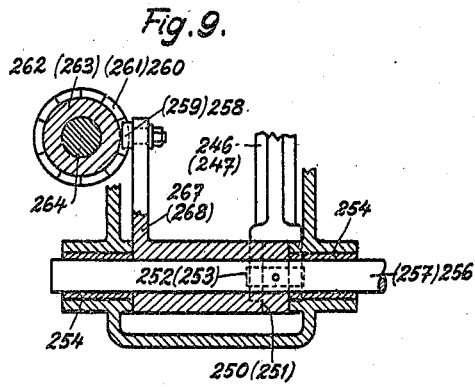
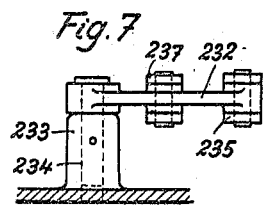
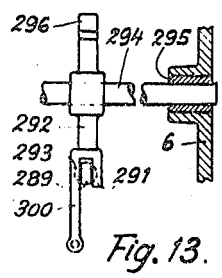
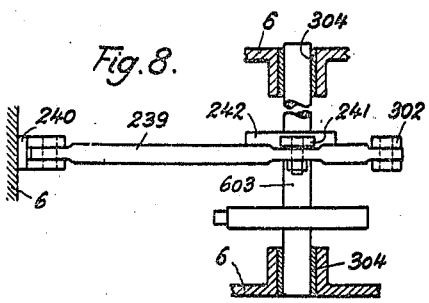

2,348,052

UNITED STATES PATENT OFFICE 2,348,052

LATHE

Philippe Boillat, Tavennes, Switzerland, assignor to the firm Tavennes Machine Co. S. A., Tavennes, Switzerland, a joint-stock company of Switzerland Application October 24, 1940, Serial No. 362,665
In Great Britain October 30, 1939

3 Claims. (Cl. 82—2)

This invention relates to lathes, specially to automatic lathes. It shows a special arrangement of the tools, particularly, but not exclusively, of the radially working tools.

In the types of lathes hitherto known the radially working tools were arranged in boxes of the star type, i. e., all the tools were placed in such a way, that the point of intersection of their axes lay on the axis of the work piece. Owing to this arrangement, the number of tools was limited.

In a lathe according to my invention these disadvantages are eliminated.

An object of my invention is to provide a slidably and pivotally mounted tool carrier which is formed as a sector. This allows the provision of a practically unlimited number of tools per sector. The change of the tools can be effected in the shortest time possible, whereby the so-called dead time is reduced to a minimum. Not only is the construction simplified but the efficiency of the lathe is also highly increased.

Another object is to provide suitable driving means for swinging the sector in order to change the tools and other driving means for imparting a feed motion to the sector. These driving means may be members and means carrying a cam path or may be eccentrics.

A further object is to provide an intermittently driven member for imparting a tool-changing rotation to said sector and a continuously driven means for imparting a feed motion to the sector. The continuously driven means may be a cam disc mounted on a continuously driven shaft which, furthermore, carries a controlling means for controlling a disengaging coupling operating said intermittently driven member.

Other objects and features will be apparent as the following description proceeds, reference being had to the accompanying drawings in which, Fig. 1 is a front view of the device, partly in section;

Fig. 2 is a top view of the device, partly in section,

Fig. 3 is a section through one sector,

Fig. 4 is a front view of the other sector,

Fig. 5 is a top view of the sector shown in Fig. 4,

Figs. 6 and 7 are side views of the levers for imparting a feed motion to the sectors;

Fig. 8 is a side view of the cam disc and the lever driving the levers shown in Figs. 6 and 7;

Fig. 9 is a section taken on line IX—IX of Fig. 1, showing parts of the drive for the tool-changing motion of one sector, the references in parentheses indicating the corresponding parts of the drive of the other sector.

Fig. 10 is a section taken on line X—X of Fig. 2;

Fig. 11 is a developed projection of the teeth of the coupling, engaging one another.

Fig. 12 shows a plate carrying an inclined surface of the disengaging coupling.

Fig. 13 shows a lever of the coupling controlling means, seen in the direction of arrrow L in Fig. 2.

Fig. 14 is a section taken on line XIV—XIV of Fig. 2.

The radially working tools 200 to 205 are fixed to the sectors 206 and 207. The fixing of these tools to the sectors is shown in Figs. 3, 4 and 5. Each of the sectors comprises a recess 208 from which elevations 209 rise. Adjusting screws 210 are screwed to these elevations. Between these adjusting screws and the wedges 211 the tools 200 to 205 are placed. These wedges can be pressed between the tools and the elevations by means of the bolts 212 screwed through the portion 213 of the sectors. In this way the tools can be clamped to the sectors.

The sectors 206, 207 are pivotally mounted on the forked ends 214, 215 of the rods 216, 217 by means of the pivots 218, 219. The rods 216, 217 are mounted, with allowance for sliding, on the bearings 220, 221. The sectors are guided, on both sides, by guide surfaces 222, 223 respectively. The surfaces 222 are provided on ledges 224 screwed to the frame 6 and the surfaces 223 on the shields 226 of the frame. Springs 227 located in holes 228 of the frame and attached to extensions 229 of the pivots 218 and 219 tend to return the tools from the work piece 230. The feed motion is imparted to the tools by rocking levers 231, 232 pivotally mounted on bearings 233 (Figs. 1, 6 and 7) by means of pivots 234. These levers 231, 232 have shoes 235 pivotally attached to one end of said levers and engaging corresponding shoes 236 on the rods 216, 217. The levers 231 and 232 are connected with each other by means of rod 237. On the pivot 234 of lever 231 an arm 238 is mounted. This arm is connected by means of a rod 302 with a rocking lever 239 (Figs. 2 and 8) pivotally mounted on a bracket 240 attached to the frame 6. To this lever 239 a pin 241 or a roller is fixed cooperating with a cam disc 242 mounted on a shaft 603 placed on bearings 304 of the frame 6 (Fig. 8). Shaft 603 is continuously driven at a speed which only depends on the amount of production desired.

Rods 246, 247 are articulated on the lugs 244, 245 of the sectors 206, 207 by means of the bolts 248, 249 and to the levers 250, 251 by means of the bolts 252, 253. The levers 250, 251 and 267, 268 are pivotally mounted on bearings 254 by means of the shafts 256, 257 (Fig. 9). Pins 258, 259 or rollers fixed to levers 267, 268 engage the cams 260, 261 attached to the cylinders 262, 263 mounted on shaft 264 placed on bearings 265, 266. Pin 259 is held in continuous contact with the cam 261 by the weight of the sector 207 and its accessories. In order to provide for continuous contact between pin 258 and cam 260 levers 313, 314 are pivotally mounted by means of a shaft 315. A rod 316 connects lever 314 with the sector 206 and a spring 317 connects lever 313 with the frame 6. From Fig. 1 it may be seen that the spring 317 constantly presses pin 258 against the cam 260. Shaft 264 is adapted to move intermittently. The intermittent rotation may be obtained by the following mechanism: Helical gear 269 mounted on shaft 264 meshes helical gear 270 whose shaft 271 is journaled on the bearings 272 and 273. The one half 274 of a toothed coupling is slidably attached to the shaft 271 by means of a key 275. The other half 276 of the coupling is fixed to the shaft 277 journaled on the bearings 278. Shaft 277 carries gear wheel 279 meshing gear wheel 280 on the shaft 44 to which a constant speed is transmitted from a motor not shown by insertion of gearings not shown. Each half of the coupling has a toothed rim comprising teeth 282, 283 respectively, cooperating with one another (Fig. 11) when the coupling is thrown in. A collar 284 is threaded to the shaft 271 and a spring 285 is provided between collar 284 and half 274, tending to throw the teeth 282 and 283 into gear with one another by shifting the half 274. Two plates 286 with an inclined surface 287 (Figs. 10 and 12) are screwed to the half 274. The upper face of these plates 286 comprising the surface 287 is adapted to cooperate with the stop 288 forming one end of the rod 289 mounted, with allowance for sliding, on the bearing 290.

To this rod 289 the forked end 291 of the rocking lever 292 is pivotally fixed by means of a bolt 293 (Figs. 2 and 13). Lever 292 is mounted on the shaft 294 journaled on bearings 295 of the frame. The other end 296 of the rocking lever 292 is adapted to cooperate with a driver 297 attached to the disc 298 mounted on the shaft 603. A spring 299 connecting an arm 300 attached to lever 292 with a stationary point 301 of the machine is provided to keep the stop 288 in engaging position. In order to prevent the end 296 of the lever 292 from being constantly pressed against the disc 298 a washer 306 is secured to the rod 289 limiting the motion of this rod and thus of lever 292.

In order to stop the rotation of the shaft 264 when the teeth of the coupling are disengaged, a cam disc 307 (Figs. 2 and 14) is fixed to shaft 271. This cam disc cooperates with the pin or roller 308 attached to the one end of the rocking lever 309 mounted on shaft 310. Spring 311 fixed to the frame 6 and to the other end of the lever 309 presses pin 308 against the cam disc 307. The hollows 312 of the cam disc 307 correspond to the position K of the stop 288 shown in Fig. 12. In this position the teeth are disengaged. The pressure with which pin 308 is pressed into the hollows 312 by means of the spring 311 suffices to stop shaft 271.

The action of the mechanism described is as follows: When two of the tools 200 to 205 for instance, tools 201 and 204 have been brought into the position shown in Figure 1 cam disc 242 gives these tools a feed motion towards the center of the work piece 230 by means of the lever 239, rod 302, lever 231, rod 237 and lever 232. When the advance of the tools is finished and the pin 241 has attained the smallest radius of the cam disc 242, i. e., when the springs 227 have withdrawn the tools, the driver 297 on disc 298 swings lever 292 against the effect of spring 299, stop 288 disengages the one plate 286, so that the teeth 282 of the half 274, under the effect of spring 285, engage the teeth 283 of the half 276. The cylinders 262, 263 with the cams 260, 261 are now rotated and the sectors 206, 207 rapidly swung around their pivots 218, 219 by means of the rods 246, 247 until other tools, for instance, 200 and 205 are brought into operating position. When the latter is reached, the other plate 286 rotating with the coupling half 274 knocks with its inclined surface 287 against stop 288 and, by further rotation, spring 285 is compressed and the teeth of the half 274 are put out of gear with the teeth of half 276 and the cylinders 262, 263 stopped with the help of the stopping device shown in Figs. 2 and 14. Half 274 has made half a revolution. Now the advance of the other tools 200 and 205 can begin.

The cam disc 242 illustrated in Fig. 2 has only one cam. It, therefore, imparts per revolution a forward motion to only two tools lying opposite each other. The sectors 206, 207 must, therefore, be turned only once per each revolution of disc 242. Thus only one driver 297 must be provided on disc 298. Be it, however, presumed that, e. g., all the tools 200 to 205 should work during one revolution of disc 242, then three cams should be provided on said disc 242 and, therefore, three drivers 297 on disc 298.

The sectors 206, 207 may also be driven independent of one another by separate cam discs, and the cams on these cam discs may be arranged in such a way that only one tool at a time works. If, in this case, all the tools should work during one revolution of the cam discs six drivers ought to be provided on disc 298.

Preferably the cams 260, 261 are interchangeably mounted on the cylinders 262, 263, e. g. by screwing them to the cylinders. The construction of the cams suitable for each machining desired and the provision of their mutual position on the cylinders is well known to those skilled in the art and, therefore, need not be described.

It is understood that the invention is not limited to the described and illustrated embodiment. The number of the tools may vary at will, and many changes, both with regard to the arrangement of the tools on their supports and to the motion-transmitting means may be resorted to by those skilled in the art without departing from the principle of the invention. Furthermore, the invention can also be applied to axially working tools.

What I claim is:

1. In an automatic lathe, a spindle to hold the work piece, a sector, a plurality of radially working tools fixed to said sector to be alternately brought in and out of working position, adjustable means mounting said sector to rotate about an axis lying in a plane going through the axis of said spindle and through the cutting edge of that of said tools which is in working position, a rotatable member mounted to oscillate said sector, suitable motion-transmitting means fastened to said sector and in cooperation with said rotatable member, a rotatable means, and other suitable motion-transmitting means between said rotatable means and said adjustable mounting means to impart feed motion to said sector.

2. In an automatic lathe, a spindle to hold the work piece, a sector, a plurality of radially working tools fixed to said sector to be alternately brought in and out of working position, said sector being mounted rotatably about an axis lying in a plane going through the axis of said spindle and through the cutting edge of that of the tools which is in working position, a rotatable member comprising a cam path shaped to oscillate said sector, motion transmitting means including elements in cooperation with said cam path, a rod pivotally attached to said elements and to said sector, a rotatable means carrying another cam path to impart a feed motion to said sector, and other suitable motion-transmitting means between said other cam path and said sector.

3. In an automatic lathe, a spindle to hold the work piece, a bearing, a rod slidably mounted on said bearing, a sector, a plurality of radially working tools fixed to said sector to be alternately brought in and out of working position, said sector being rotatably fixed to the end of said rod about an axis lying in a plane going through the axis of said spindle and through the cutting edge of that of the tools which is in working position, a rotatable member comprising a cam path shaped to oscillate said sector, motion-transmitting means including elements in cooperation with said cam path, another rod pivotally attached to said elements and to said sector, a rotatable means carrying another cam path to impart a feed motion to said sector, and other suitable motion transmitting means between said other cam path and said rod.

PHILIPPE BOILLAT.